US007011925B2

(12) United States Patent
Alpert

(10) Patent No.: US 7,011,925 B2
(45) Date of Patent: Mar. 14, 2006

(54) THREE-DIMENSIONAL OPTICAL MEMORY

(75) Inventor: Ortal Alpert, Jerusalem (IL)

(73) Assignee: Mempile Inc., Wilmington, DE (US)

( * ) Notice: Subject to any disclaimer, the term of this patent is extended or adjusted under 35 U.S.C. 154(b) by 0 days.

(21) Appl. No.: 10/240,420

(22) PCT Filed: Mar. 28, 2001

(86) PCT No.: PCT/IL01/00286

§ 371 (c)(1),
(2), (4) Date: Jun. 12, 2003

(87) PCT Pub. No.: WO01/73779

PCT Pub. Date: Oct. 4, 2001

(65) Prior Publication Data

US 2004/0022165 A1 Feb. 5, 2004

(30) Foreign Application Priority Data

Mar. 28, 2000 (IL) ..................................... 135309

(51) Int. Cl.
*G11B 7/24* (2006.01)
(52) U.S. Cl. ................ 430/270.18; 430/945; 428/64.8; 369/275.2
(58) Field of Classification Search .......... 430/270.18, 430/945; 428/64.8; 369/275.2
See application file for complete search history.

(56) References Cited

U.S. PATENT DOCUMENTS

| 3,328,466 A | * | 6/1967 | Bluhm | 568/584 |
| 3,523,903 A | * | 8/1970 | Bluhm | 252/582 |
| 3,692,848 A | * | 9/1972 | Mueller et al. | 568/857 |
| 3,954,887 A | * | 5/1976 | Wilke et al. | 568/807 |
| 4,357,616 A | * | 11/1982 | Terao et al. | 346/135.1 |
| 5,023,859 A | * | 6/1991 | Eich et al. | 365/113 |
| 5,192,644 A | * | 3/1993 | Ohta et al. | 430/338 |
| 5,196,250 A | | 3/1993 | Abe et al. | |
| 5,268,862 A | | 12/1993 | Rentzepis | |
| 5,592,462 A | | 1/1997 | Beldock et al. | |
| 5,627,817 A | | 5/1997 | Rosen et al. | |
| 6,045,888 A | * | 4/2000 | Chen et al. | 428/64.1 |

(Continued)

FOREIGN PATENT DOCUMENTS

EP 0 658 887 A1 6/1995

(Continued)

OTHER PUBLICATIONS

Sousa et al. J. Org. Chem. vol. 34(11) pp. 3320-3323.*

(Continued)

*Primary Examiner*—Martin Angebranndt
(74) *Attorney, Agent, or Firm*—Browdy and Neimark, PLLC

(57) ABSTRACT

The present invention is directed to a three-dimensional memory apparatus for storing information in a volume comprising of an active medium. The active medium is capable of changing from a first to a second isomeric form as a response to radiation of a light beam having an energy substantially equal to a first threshold energy. The concentration ratio between a first and a second isomeric form in any given volume portion represents a data unit. The active medium in the memory apparatus comprises of diarylalkene derivatives, triene derivatives, polyene derivatives or a mixture thereof. The invention is further directed to means for reading the data units from the isomeric states of the active medium in different portions of said active medium where the two isomeric forms have a substantially different absorption coefficient for absorbing energy of a second threshold energy. Reading may also be carried out by measuring the scattering pattern of the two isomeric forms.

19 Claims, 6 Drawing Sheets

U.S. PATENT DOCUMENTS 6,423,799 B1 * 7/2002 Berneth et al. .......... 526/218.1

FOREIGN PATENT DOCUMENTS

| JP | 61-263935 | * 11/1986 |
| JP | 63-261538 | * 10/1988 |
| JP | 03-014538 | * 1/1991 |
| JP | 03-283022 | * 12/1991 |
| JP | 04-089279 | * 3/1992 |
| WO | 97/44365 | * 11/1997 |
| WO | WO 97/43759 A1 | 11/1997 |
| WO | WO 98/31018 A1 | 7/1998 |
| WO | WO 98/37456 A1 | 8/1998 |
| WO | WO 99/24527 A1 | 5/1999 |

OTHER PUBLICATIONS

Freeman et al. J. Org. Chem. vol. 23 pp. 136-137.*

Hugelshofer et al. Helvetica Chimica Acta (1960) No. 165 pp. 1322-1332.*

Miyazawa et al., "Selective Isomerization of cis-Stilbene by Non-Resonant Two-Photon Excitation", Chemistry Letters, p 217-218 (1995).*

Hunter et al., Appl. Opt. vol. 29(14) pp. 2058-2066 (May 1990).*

Chen et al., "Measurements of Two-photon Absorption cross-sections of common blue dyes", Optics Commun., vol. 63 (5), pp. 335-338 (Sep. 1987).*

Gorner, J. Photochem. Photobiol. A: Chemistry, vol. 90 pp. 57-63 (1995).*

Hackh's Chemical Dictionary, Fourth Ed. (1972), p 690, citation of "-triene".*

Skoog, D.A., et al., "Principles of Instrumental Analysis", Second Ed., (1980) pp. 231 Figure 8-12 (IR spectrum correlation chart).*

Morrison & Boyd, "Organic Chemistry" $3^{rd}$ Ed. (1974) pp. 145-151.*

English translation of JP 61-263935.*

English translation of JP 04-089279.*

English translation of JP 03-283022.*

Albota, et al, "Design of Organic Molecules with Large Two-Photon Absorption Cross Sections". (Sep. 11, 1998). vol. 281, pp. 1653-1656.

Burr, Geoffrey, "Three-Dimensional Optical Storage". SPIE Conference on Nano- and Micro-Optics for Information Systems. (Aug. 4, 2003). Paper 5225-16.

Irie, Masahiro, "Thematic Issue: Photochromism: Memories and Switches". Chemical Reviews. (2000). vol. 100, No. 5. pp. 1685-1716.

* cited by examiner

THREE-DIMENSIONAL OPTICAL MEMORY

FIELD OF THE INVENTION

This invention relates to a 3-dimensional optical data storage and retrieval system.

BACKGROUND OF THE INVENTION

The following publications are referred to in the present description:
1) U.S. Pat. No. 5,592,462
2) U.S. Pat. No. 5,268,862

The computerized era has raised the need to provide reliable means for storing large amounts of data. Ever-growing amounts of information are nowadays stored in personal and commercial computers, and with progress of technology, this demand will surely grow. One approach to fulfill such a need is to use optical methods for the storage of data, since an optical memory makes it feasible to pack information as binary digits at very high density. Furthermore, the stored information could be maintained undamaged for long periods of time, with no apparent loss of information.

U.S. Pat. No. 5,592,462 (Beldock) describes a three dimensional system for optical data storage and retrieval. According to this publication, incorporated herein as a reference, the data is stored and retrieved by irradiating the storage medium with two interfering light beams. The use of two light beams allows the definition of the particular portion of the volume being written or read at every instance.

U.S. Pat. No. 5,268,862 (Rentzepis) describes an active medium for use in a system of the kind describe by Beldock. The medium makes use of two forms of a spirobenzopyran derivative to represent the two binary digits. However, the memory is maintained at a temperature lower than room temperature, typically at −78° C. Thus writing, storing the written information and reading is done at this low temperature. Raising the temperature will erase the entire stored information, as the active isomer is stable at room temperature for only 150 seconds. The maintenance of such a memory is expensive and cannot be used commercially. Furthermore, the reading process is associated with detecting the fluorescence; a process involving heat, thus there is the possibility of loss of stored data while reading.

There is thus a need for a low-cost, stable and efficient optical memory.

SUMMARY OF THE INVENTION

According to one aspect, the present invention provides a three-dimensional memory apparatus for storing information in a volume comprising an active medium, which is capable of changing from a first isomeric form to a second isomeric form and back as a response to a light radiation of an energy substantially equal to a first threshold energy, wherein the concentration ratio between the first and the second isomeric forms in a given volume portion represents a data unit; said memory apparatus being characterized in that said active medium comprises diarylalkene derivatives, triene derivatives, polyene derivatives or a mixture thereof.

The active medium of the present invention may be embedded in a supporting matrix, which may be a polymer, and the active medium is chemically bound thereto. Alternatively the supporting matrix may be a wax or a micelle and the active medium is homogeneously distributed therein.

The information stored by the apparatus of the present invention is stored as a series of data units.

According to one embodiment, the data units are binary digits, and each portion of the active medium comprised in the volume represents a 0 or a 1. In this case, there is set a high concentration ratio threshold and a low concentration ratio, and volume portions having a concentration ratio above the high ratio threshold represent 1 digit, while portions having a concentration ratio below the low ratio threshold represent the other digit. For example, a volume portion having 70% or less active medium of the first isomeric form may represent 0, while a volume portion having 80% or more active medium of the second isomeric form may represent 1.

Alternatively, the data representation is analog, and each concentration ratio represents a predefined data unit.

An active medium should be understood as a plurality of molecules or active groups of a polymer confined within a given volume that are capable of changing their states from one isomeric form to another.

The first threshold energy corresponds to the energy required to photochemically convert a molecule of the active medium from the first isomeric form to the second one.

Diarylalkene derivatives according to the present invention are of the general formula $Ar_1R_1C=CAr_2R_2$, wherein $Ar_1$ and $Ar_2$ which could be the same or different, are independently substituted or non-substituted aryl wherein the substituted groups have a strong absorption in the IR region or may display effective Raman scattering and; $R_1$ and $R_2$ which are the same or different are groups having strong absorptions in the IR region.

Polyene derivatives according to the present invention are polyenes having up to 11 double bonds, wherein the substituted groups have strong absorption in the I.R. region or may display effective Raman scattering.

Preferably, the apparatus according to the invention further comprises means for reading the data units from the isomeric forms of the active medium in different portions of said active medium.

Preferably, the isomeric form of a specific portion of the active medium is to be controlled (in the writing process) and determined (in the reading process) by directing towards the portion at least two light beams that intersect and interfere therein.

According to another of its aspects, the invention provides a method of producing a three-dimensional pattern of different absorption coefficients for a given light in a volume comprising an active medium. The active medium comprises diarylalkene derivatives, triene derivatives, polyene derivatives or a mixture thereof, and is capable of being in either a first, second or other isomeric form. According to this aspect of the invention, the active medium is sensitive to light beam having energy that is substantially equal to a first threshold energy. This method of the invention comprises:

directing a first light beam, having an energy different than the above-mentioned first threshold energy to a selected portion of the active medium; and directing at least one additional light beam having at least one additional energy that is different than the first threshold energy, to the same selected portion of the active medium;

wherein the combined energy of the first light beam and the at least one additional light beam are substantially equal to the first threshold energy.

In this method of the invention, the transfer from one set of isomeric form to the other sets of isomeric forms is a result of multiphoton absorption.

According to one embodiment of the present invention, the "at least one additional light beam" is a single additional light beam, and the transfer from one isomeric form to the other is a result of biphoton absorption.

The combined energy may be either the sum or the difference of the energies of the various light beams directed to the selected portion volume.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF PREFERRED EMBODIMENTS

Figure 1A:
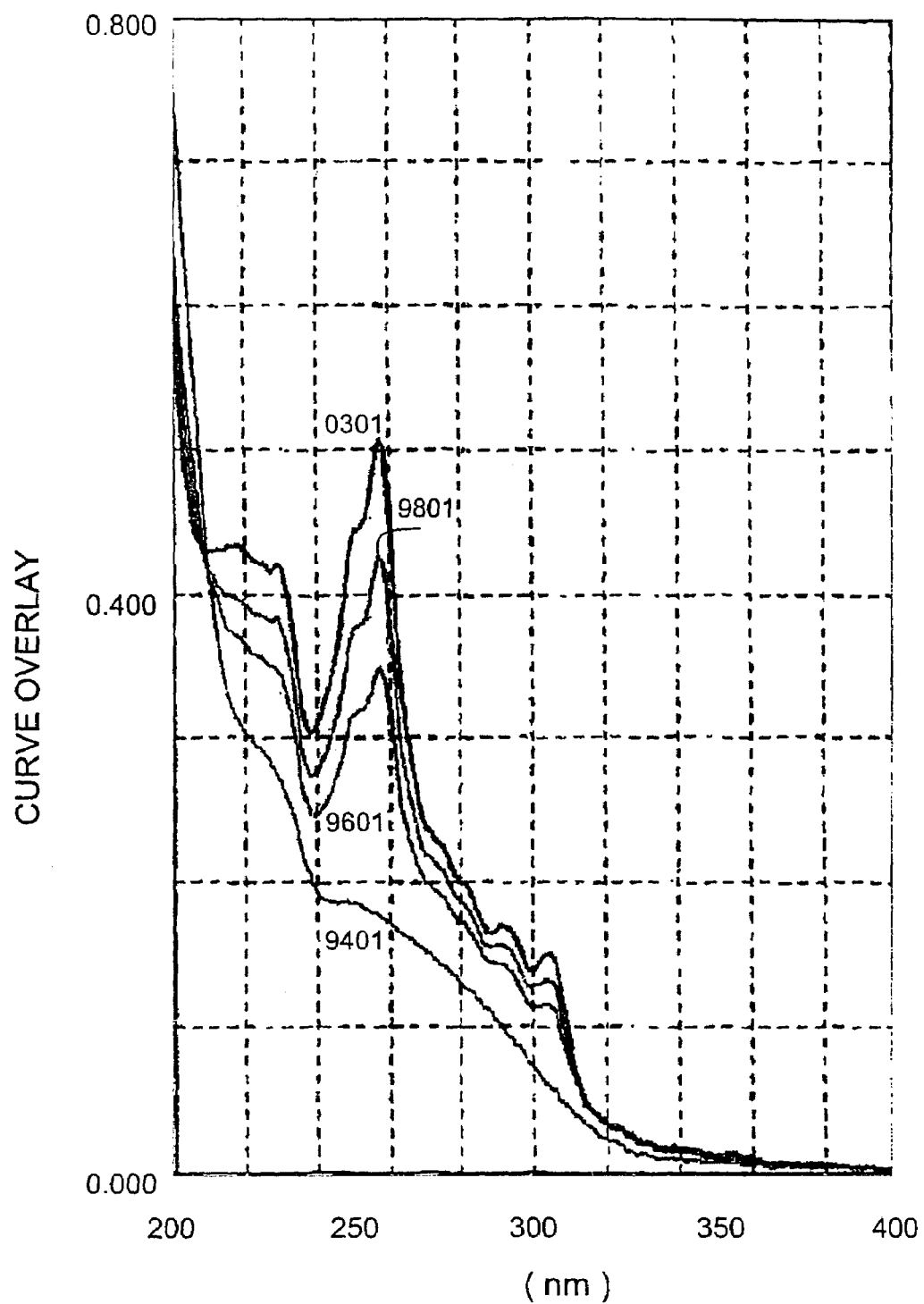
FIGS. 1A and 1B illustrate, respectively, a U.V. spectrum of a bulk of a trans substituted stilbene (diester) showing the formation of the cis isomer, and the spectrum of the formed cis isomer.

According to a preferred embodiment of the present invention the active medium is embedded in a supporting matrix. The supporting matrix may be a polymer, where the active medium is chemically bound thereto, preferably through substituents of the aryl groups of the diarylalkene derivatives. Alternatively, the active medium may be homogeneously distributed within an inert medium such as wax, or micelles containing medium forming cubic phases such as cubosom.

According to a preferred embodiment of the present invention, the memory apparatus according to the invention comprises: means for directing light beam having a first energy, different from that of the first threshold energy to a selected portion of the active medium, and means for directing additional light beams having additional energies different from the first threshold energy, to the same selected portion of the active medium. The combined energy of the first light beam and the additional light beams are substantially equal to the first threshold energy. A system suitable for this embodiment is described in ref. 2, and in ref 1, for the case wherein one additional light beam is used.

In a preferred embodiment of the invention, the isomeric forms of the active medium have a substantially different absorption coefficient for absorbing energy of a second threshold energy, thus allowing the retrieval of the information in a manner similar to its preferred manner of writing, described below.

The writing of the information is usually accomplished in accordance with the present invention by irradiating the active medium with light in the visible or UV regions, while the reading typically utilizes light in the IR region, or may be detected by measuring the Raman scattering. Such a reading process at a low energy does not heat the system and does not distract the stored information.

Thus, when the active medium according to the invention comprises diarylalkene derivatives of the general formula $Ar_1R_1C=CAr_2R_2$, the $R_1$ and $R_2$ substituents of these diarylalkene derivatives or the substituents on the aryl rings determine the IR spectrum or the Raman scattering pattern of the two isomeric forms of the active medium. The substituents on the aryl rings and the $R_1$ and $R_2$ substituents which may be the same or different are chosen from groups having strong absorption in the IR region or display Raman scattering. The I.R. spectra of the aryl substituents and the $R_1$ and $R_2$ substituents, or their Raman scattering pattern will be significantly different in each of the different isomeric forms of the diarylalkene derivative.

Accordingly, the aryl substituents and the R1 and $R_2$, which may be similar or different, and preferably are the same, are selected from the group of $C_{1-8}\beta$-carboxylic acids or their esters, 2-hydroxy$C_{1-8}$alkyl, 2-fluoroxy$C_{1-8}$alkyl, 2-nitro$C_{1-8}$alkyl, 2-cyano$C_{1-8}$alkyl or a nitro group. Alternatively, one of $R_1$ or $R_2$ may be as defined above and the other group may be a polar group, such as a halide or cyano group. Most preferably the aryl substituents and the $R_1$ and $R_2$ are chosen from ethanol or propanol.

When the active medium according to the invention comprises a polyene derivative, the polyene can have up to 11 double bonds and it may be chosen from carotenoid pigments such as lycopene or β-carotene or melanoidin pigments. The substituents on the various double bonds determine the I.R spectrum or the Raman scattering pattern of each of the possible isomeric forms of the active medium. The substituents are chosen from groups having strong absorption in the I.R. region or display Raman scattering. The I.R. spectra or the Raman scattering of the substituents will be significantly different in each of the different isomeric forms of the polyene derivative. The Raman scattering may be detected by Coherence Anti-Stocks Raman Spectroscopy (CARS), by Raman Induced Kere Effect Spectroscopy (RIKES) or a variation thereof.

The use of such diarylalkene, triene, polyene derivatives or mixtures thereof allows the memory apparatus of the invention to be fully operative in room temperature, due to the great thermal stability of each of their isomeric forms. The two isomeric states of the diarylalkene are stable for long periods of time, and no spontaneous thermally induced inter-conversion of one isomeric form to the other occurs. This stability further enables the memory apparatus to be of a kind that may be written and read many times,

EXAMPLES

Example 1

Figure 1B:
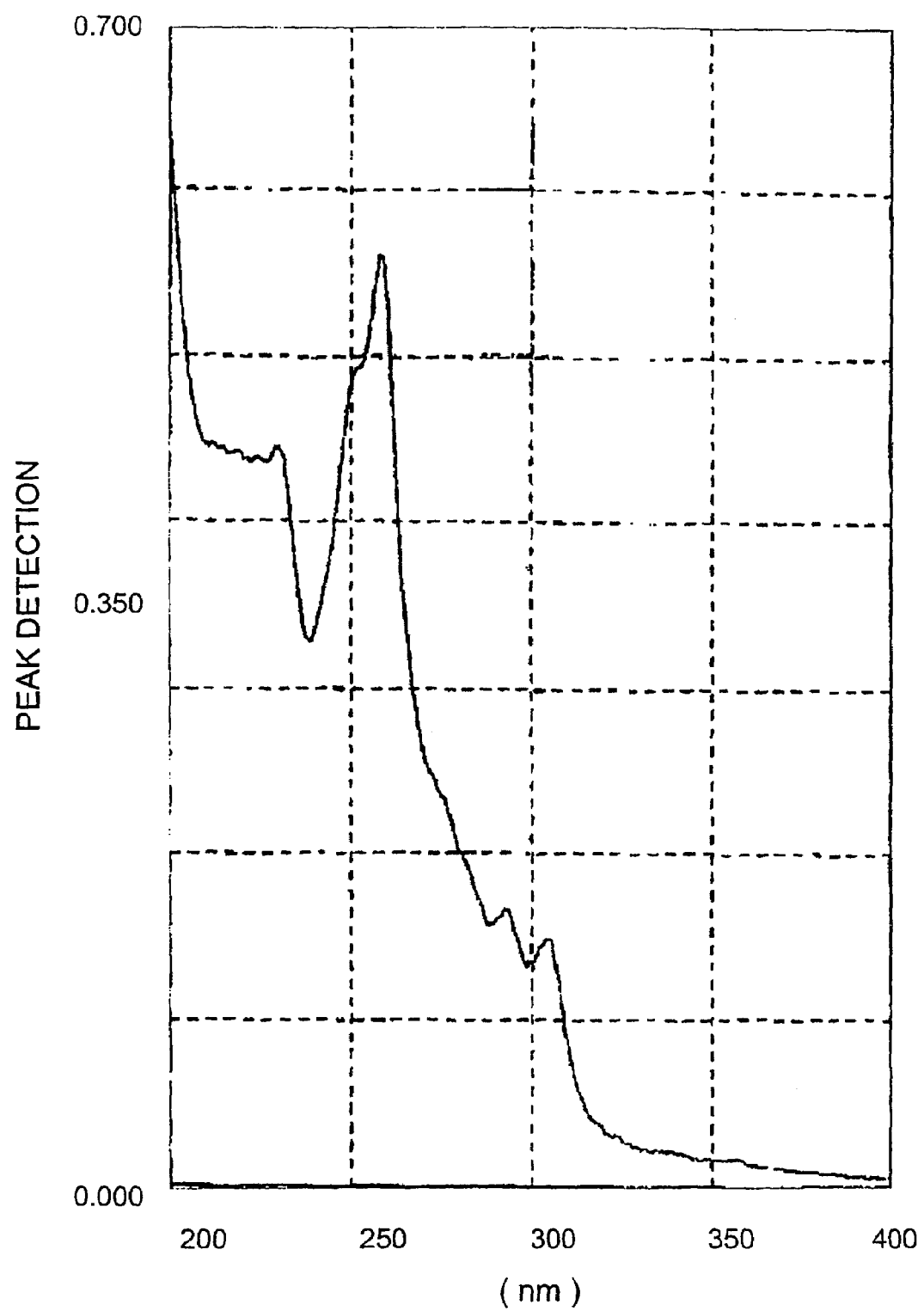

Pure trans-4-bromostilbene diethylacetate was dissolved in acetonitrile and irradiated with a mercury lamp having a Hg filter. The U.V. spectrum displayed in FIG. 1A illustrates the spectrum of the pure trans isomer (designated 9401). The cis isomer has a strong absorption at 254 nm, and thus also shown are the resulting spectrum of the formed mixture of trans and cis isomers after 5 minutes of irradiation (designated 9601), the resulting spectrum of the formed mixture of trans and cis isomers after 8 minutes of irradiation (designated 9801) and the resulting spectrum of the formed mixture of trans and cis isomers after 15 minutes of irradiation (designated 0301). FIG. 1B illustrates the spectrum of the cis-4-bromostilbene diethylacetate after 18 hrs of irradiation.

Example 2

Pure trans-stilbene dipropanol was dissolved in acetonitrile and irradiated with a mercury lamp having a Hg filter.

Figure 2A:
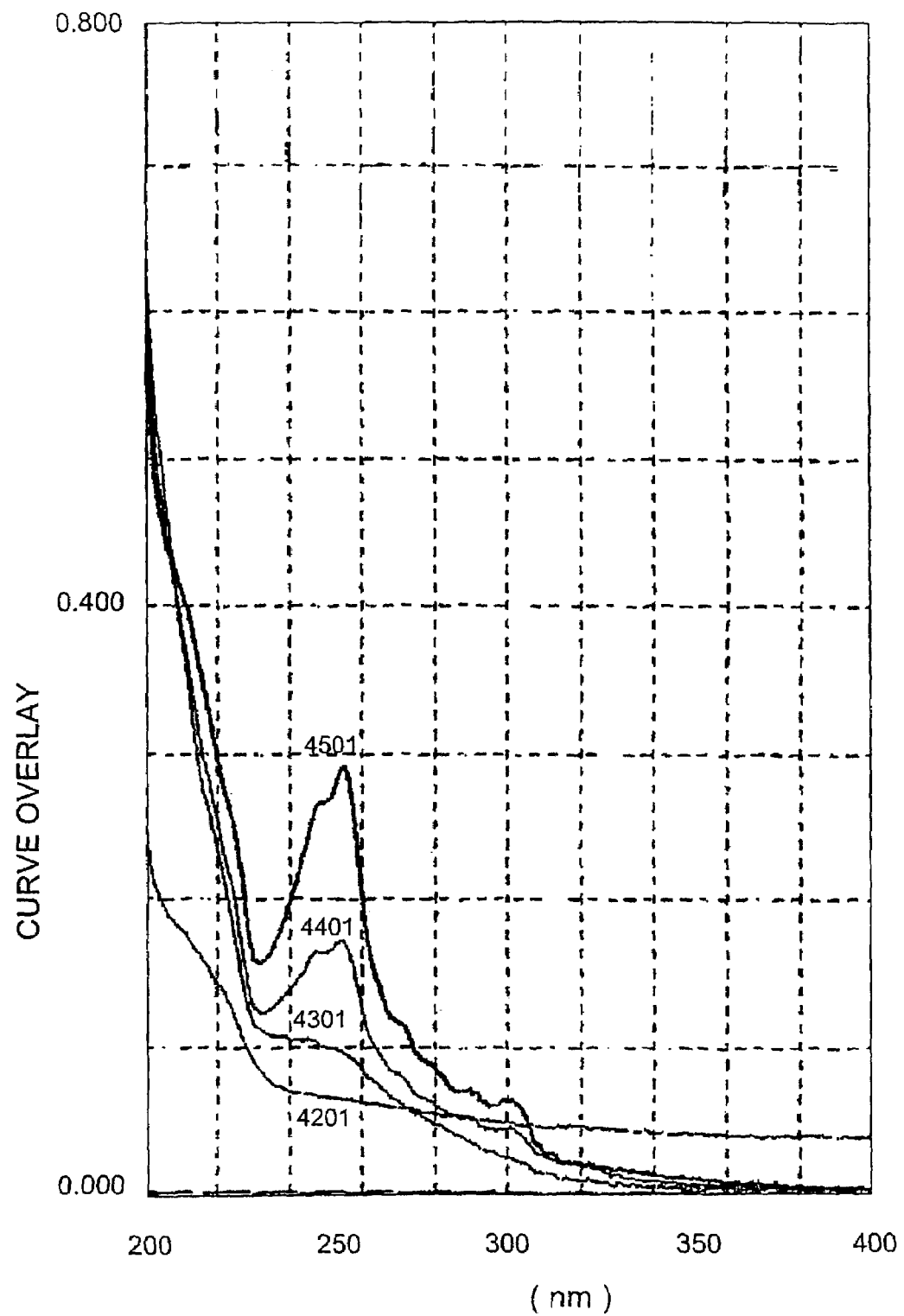
FIGS. 2A and 2B illustrate, respectively, a U.V. spectrum of a bulk of a trans substituted stilbene (dialcohol) showing the formation of the cis isomer, and the spectrum of the formed cis isomer.
Figure 2B:
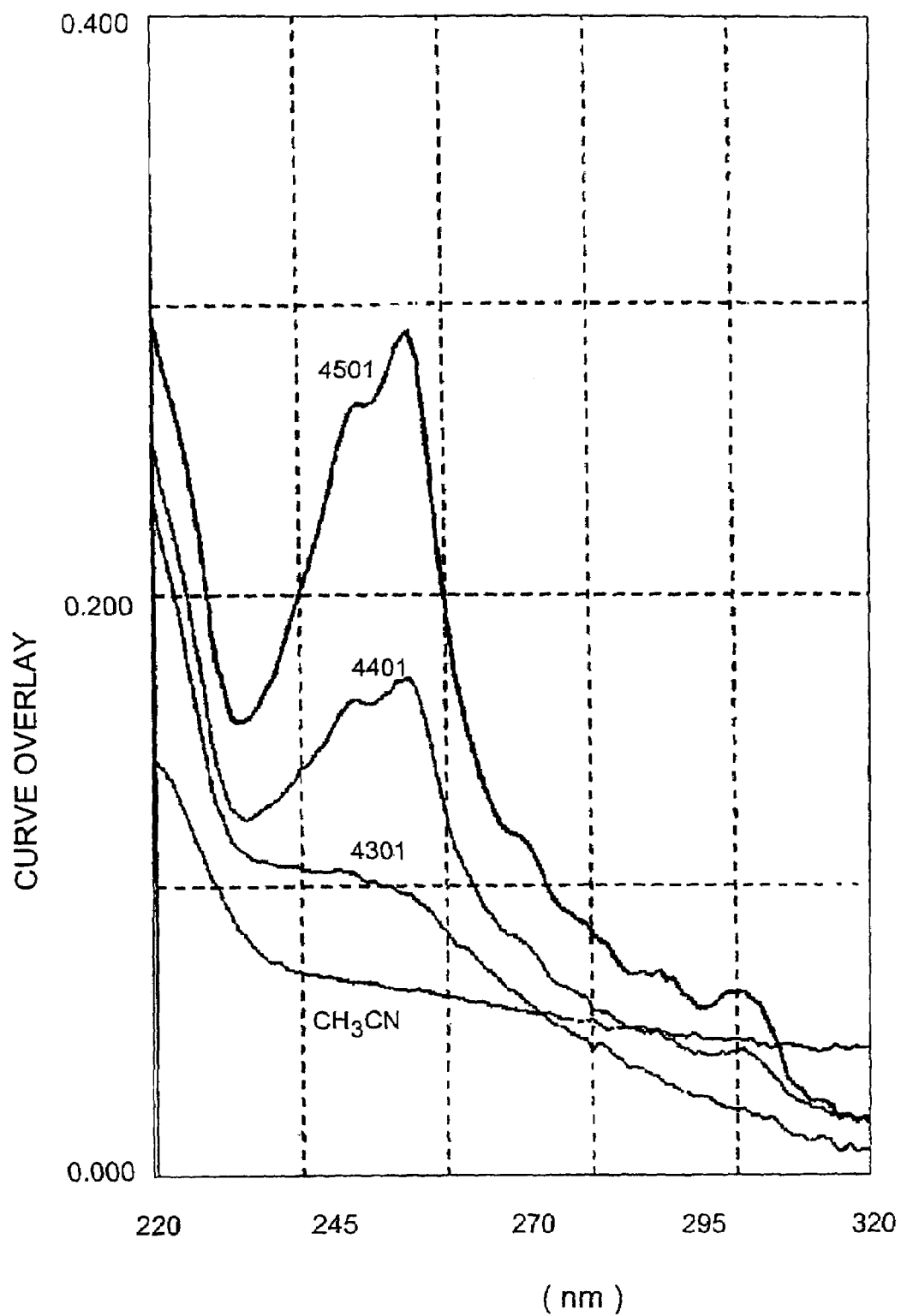
Figure 3:
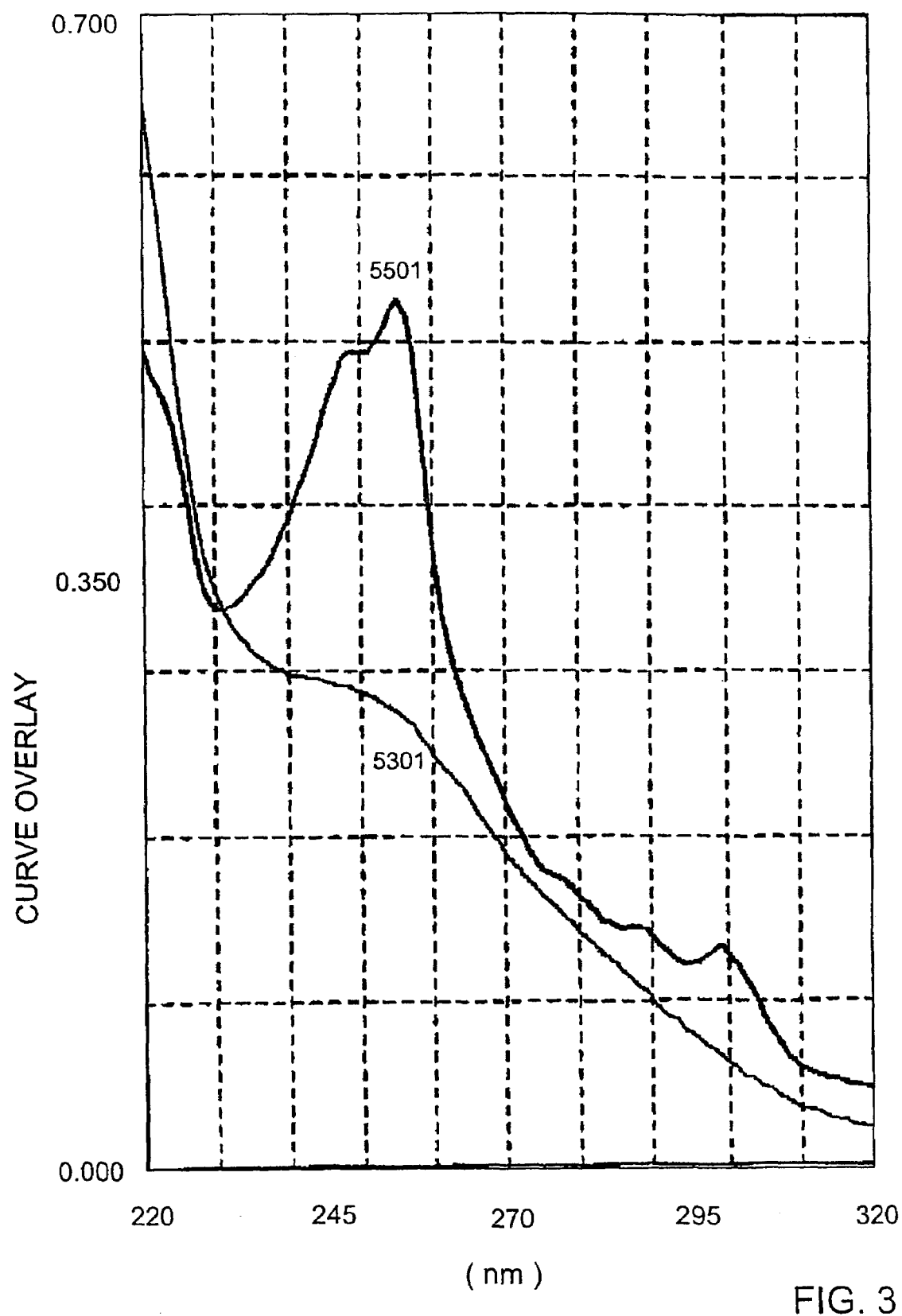
FIG. 3 illustrates a U.V. spectrum of a bulk of a trans substituted stilbene (diester) showing the formation of the cis isomer
Figure 4:
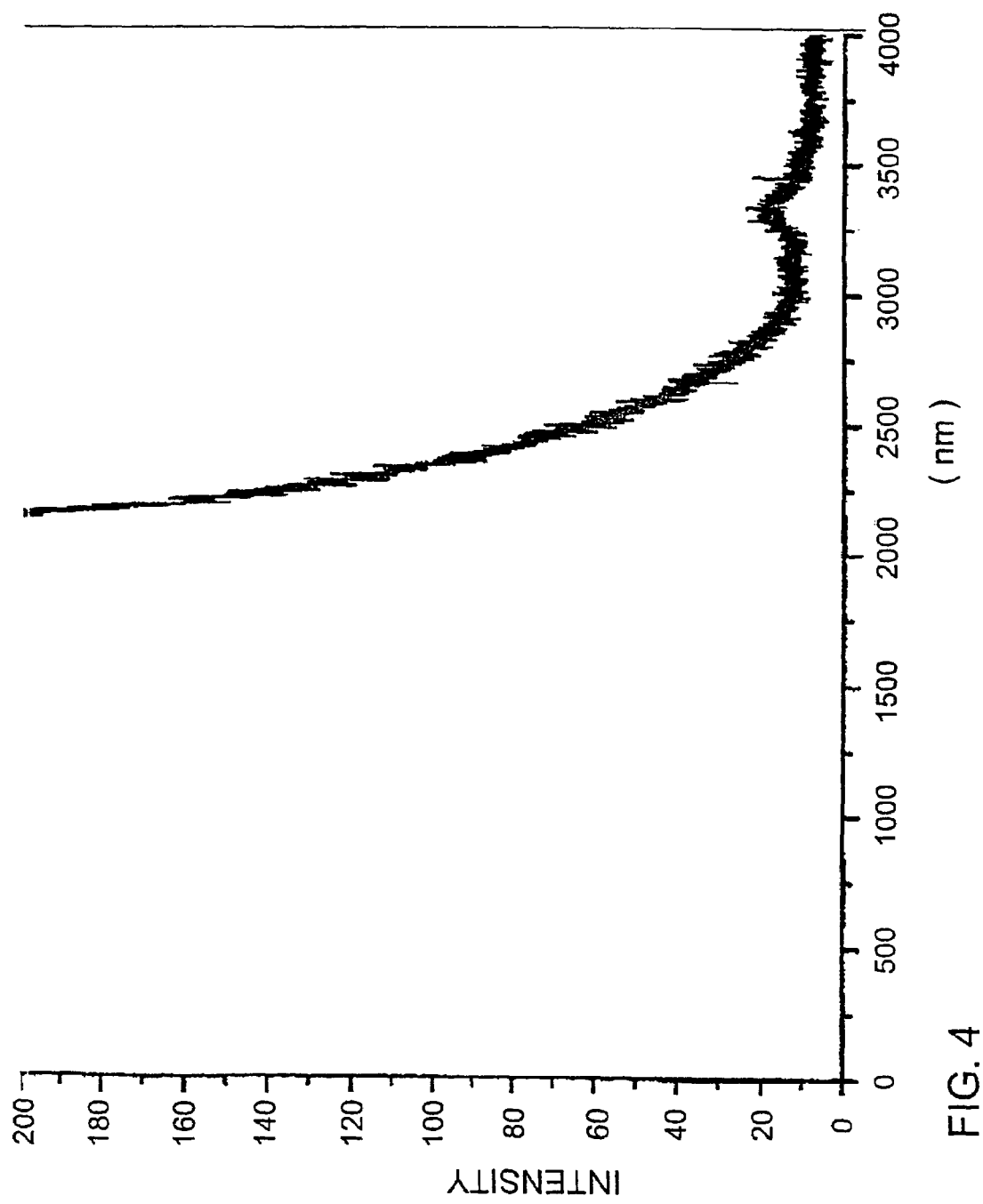
FIG. 4 illustrates a Raman scattering of the cis isomer.

The U.V. spectrum displayed in FIG. 2A illustrates the spectrum of the pure trans isomer (designated 4301), the resulting spectrum of the formed mixture of trans and cis isomers (having a strong absorption at 254 nm) after 2 minutes of irradiation (designated 4401), the resulting spectrum of the formed mixture of trans and cis isomers after 6 minutes of irradiation (designated 4501). The spectrum of the acetonitrlie is designated 4201. FIG. 2B illustrates the spectrum of the cis-stilbene dipropanol as in FIG. 2A, however after the abstraction of the acetonitrile spectrum.

Example 3 trans-stilbene diethylacetate was dissolved in acetonitrile and irradiated with a mercury lamp having a Hg filter. The displayed U.V. spectrum illustrates the spectrum of the pure trans isomer (designated 5301), and the resulting spectrum of the formed cis isomer (having a strong absorption at 254 nm) after 22 hrs of irradiation (designated 5501)

Example 4 cis-stilbene dipropanol was irradiated and the resulting Raman scattering spectrum is illustrated showing the characteristic absorption of the hydroxyls.

The invention claimed is:

1. A three-dimensional memory apparatus for storing information in and retrieving information from a three-dimensional volume, comprising
    an active medium, which is capable of changing from a first to a second isomeric form as a response to radiation of a light beam having an energy substantially equal to a first threshold energy, wherein the concentration ratio between a first and a second isomeric form in any given volume portion represents a data unit;
    means for exposing said active medium to said light beam to induce a multiphoton absorption;
    said memory apparatus being characterized in that said active medium comprises a diarylalkene derivative of the general formula $Ar_1(R_1)C=C(R_2)Ar_2$,
    wherein $Ar_1$ and $Ar_2$, which could be the same or different, are independently substituted or non-substituted aryl rings wherein the substituted groups have a strong absorption in the IR region; and
    $R_1$ and $R_2$ which are the same or different, are groups having strong absorption in the IR region;
    wherein said active medium is embedded in a three-dimensional supporting matrix; and
    further comprising means for reading a data unit stored within said given volume portion of said active medium embedded in said three-dimensional supporting matrix by measuring said concentration ratio between said first and second isomeric forms.

2. A memory apparatus according to claim 1, wherein said data units are binary digits.

3. A memory apparatus according to claim 1, wherein said supporting matrix is a polymer, and said active medium is chemically bound to a polymer.

4. A memory apparatus according to claim 1, wherein the supporting matrix is a wax or a micelle forming a cubic phase, and said active medium is homogeneously distributed therein.

5. A memory apparatus according to claim 1, wherein said means for reading comprises:
    means for directing a light beam having a first energy, different from said first threshold energy, to a selected portion of the active medium; and
    means for directing at least one additional light beam having at least one additional energy, also different from said first threshold energy, to said selected portion of the active medium;
    wherein the combined energies of the first light beam and that of the at least one additional light beam are substantially equal to the first threshold energy.

6. The apparatus according to claim 1, wherein the two isomeric forms have a substantially different absorption coefficient for absorbing energy of a second threshold energy.

7. The apparatus according to claim 6, wherein said substantially different absorption coefficient is in the I.R. region.

8. The apparatus according to claim 1, wherein the two isomeric forms have a substantially different scattering pattern of incidence energy.

9. The apparatus according to claim 8, wherein said substantially different scattering pattern of incidence energy is Raman scattering.

10. An apparatus according to claim 6 or 7, wherein said means for reading the data units, comprises
    means for directing a first light beam having an energy different than said second threshold energy to a selected portion of the active medium; and
    means for directing at least one additional light beam having at least one additional energy different than said second threshold energy, to said selected portion of the active medium.

11. A memory apparatus according to claim 1, wherein the $R_1$ and $R_2$ groups are selected from $C_{1-8}\beta$-carboxylic acids or their esters, 2-hydroxy$C_{2-8}$alkyl, 2-fluoroxy$C_{2-8}$alkyl, 2-nitro$C_{2-8}$alkyl, 2-cyano$C_{2-8}$alkyl or a nitro group.

12. A memory apparatus according to claim 11 wherein the $R_1$ and $R_2$ groups are selected from 2-ethanol or 2-propanol.

13. A memory apparatus according to claims 9, 11 or 12, wherein the aryl substituents and the $R_1$ and $R_2$ groups are the same.

14. A memory apparatus according to claim 11, wherein the aryl substituents and the $R_1$ and $R_2$ groups are different, wherein one is chosen from $C_{1-8}\beta$-carboxylic acids or their esters, 2-hydroxy$C_{2-8}$alkyl, 2-fluoroxy$C_{2-8}$alkyl, 2-nitro$C_{2-8}$alkyl, 2-cyano$C_{2-8}$alkyl or a nitro group and the other from a halide or a cyano group.

15. A memory apparatus according to claim 14 wherein the aryl substituents and the $R_1$ and $R_2$ groups are selected from 2-ethanol or 2-propanol.

16. A memory apparatus according to claim 1, capable of being written and read many times.

17. A method of producing a three-dimensional pattern of different absorption coefficients for a given energy threshold in a volume, comprising
    an active medium, said active medium comprising a diarylalkene derivative of the general formula $Ar_1(R_1)C=C(R_2)Ar_2$, wherein $Ar_1$ and $Ar_2$, which could be the same or different, are independently substituted or non-substituted aryl rings, wherein the substituted groups have a strong absorption in the IR region; and
    $R_1$ and $R_2$ which are the same or different, are groups having strong absorption in the IR region and capable of being in either a first or a second isomeric form,
    said medium being sensitive to radiation of an energy substantially equal to a first threshold energy;
    wherein said active medium is embedded in a supporting matrix;

the method comprising:
directing a light beam having a first energy different from said first threshold energy, to a selected portion of the active medium; and
directing at least one other light beam having at least one other energy different from said first threshold energy, to said selected portion of the active medium;
wherein the combined energy of the first light beam and that of the at least one additional light beam are substantially equal to the first threshold energy level.

18. A method for reading data from a three-dimensional pattern of different absorption coefficients for a given energy threshold,
said three-dimensional pattern being in a selected portion of an active medium embedded in a supporting matrix, said active medium comprising a diarylalkene derivatives of the general formula $Ar_1(R_1)C=C(R_2)Ar_2$,
wherein $Ar_1$ and $Ar_2$, which could be the same or different, are independently substituted or non-substituted aryl rings, wherein the substituted groups have a strong absorption in the IR region; and
$R_1$ and $R_2$ which are the same or different, are groups having strong absorption in the IR region;
said method of reading comprising:
directing a first light beam having a first energy different from a said energy threshold, to said selected portion of said active medium;
directing at least one additional light beam having at least one additional energy different from said threshold energy, to said selected portion of the active medium;
wherein the combined energy of the first light beam and that of the at least one additional light beam are substantially equal to the threshold energy; and
detecting data stored in said three-dimensional pattern and revealed by said directing of light.

19. A three-dimensional memory apparatus for storing information in a volume comprising
an active medium, bound to in a supporting matrix,
said active medium being capable of changing from a first to a second isomeric form as a response to radiation of a light beam having an energy substantially equal to a first threshold energy, wherein the concentration ratio between a first and a second isomeric form in any given volume portion represents a data unit;
said memory apparatus being characterized in that said active medium comprises diarylalkene derivatives, of the formula $Ar_1(R_1)C=C(R_2)Ar_2$, chemically bound to a polymer, wherein $Ar_1$ and $Ar_2$ can be the same or different and are selected from substituted or unsubstituted aryl rings where any substitutents have strong absorption in the IR region and $R_1$ and $R_2$ can be the same or different and are groups having strong absorption in the IR region,
means for directing a light beam having a first energy, different from said first threshold energy, to a selected portion of the active medium; and
means for directing at least one additional light beam having at least one additional energy, also different from said first threshold energy, to said selected portion of the active medium;
wherein the combined energies of the first light beam and that of the at least one additional light beam are substantially equal to the first threshold energy.

* * * * *